United States Patent [19]
Hester

[11] Patent Number: 5,826,684
[45] Date of Patent: Oct. 27, 1998

[54] BRAKE DRUM HAVING RIBS ON DRUM OUTER SURFACE

[75] Inventor: Larry B. Hester, Dayton, Ohio

[73] Assignee: Dayton Walther Corporation, Dayton, Ohio

[21] Appl. No.: 762,104

[22] Filed: Dec. 6, 1996

Related U.S. Application Data

[60] Provisional application No. 60/008,321 Dec. 7, 1995.
[51] Int. Cl.⁶ ..................................................... F16D 65/10
[52] U.S. Cl. ................................ 188/218 R; 188/264 R; 192/113.1; 301/6.1
[58] Field of Search ........................... 188/218 R, 264 R, 188/264 W, 106 A; 192/113.1, 113.2, 113.22; 301/6.1, 6.3, 6.91, 63.1, 65

[56] References Cited

U.S. PATENT DOCUMENTS

| | | |
|---|---|---|
| 2,274,503 | 2/1942 | Reid ...................................... 188/218 R |
| 2,998,870 | 9/1961 | Herman et al. ....................... 188/218 R |
| 3,003,598 | 10/1961 | Sumner et al. . |
| 3,005,259 | 10/1961 | Benya et al. . |
| 3,007,553 | 11/1961 | Sinclair et al. . |
| 3,013,636 | 12/1961 | Dotto et al. . |
| 3,016,269 | 1/1962 | De Lorean . |
| 3,043,631 | 7/1962 | Swoboda . |
| 3,066,766 | 12/1962 | Minor et al. . |
| 3,151,709 | 10/1964 | Troy . |
| 3,151,710 | 10/1964 | Troy . |
| 3,323,620 | 6/1967 | Klauer et al. . |
| 3,583,533 | 6/1971 | Jones, Jr. et al. . |
| 3,630,323 | 12/1971 | Hickle . |
| 3,738,463 | 6/1973 | Kunst et al. . |
| 3,743,063 | 7/1973 | Heydenreich et al. . |
| 3,889,786 | 6/1975 | Schrader et al. . |
| 4,008,517 | 2/1977 | Schrader et al. . |
| 4,262,407 | 4/1981 | Petersen et al. . |
| 4,266,638 | 5/1981 | Petersen et al. . |

(List continued on next page.)

FOREIGN PATENT DOCUMENTS

| | | | |
|---|---|---|---|
| 52633 | 5/1981 | Japan | ................................. 188/218 R |
| 208329 | 12/1982 | Japan | ................................. 188/218 R |
| 50332 | 3/1983 | Japan | ................................. 188/218 R |
| 2232449 | 12/1990 | United Kingdom . | |

OTHER PUBLICATIONS

SAE Technical Paper Series "A Study on Drum Brake Noise by Hollographic Vibration Analysis", A. Felske, G. Hoppe, and H. Matthai, Feb. 25–29, 1980.

"A Study on Drum–Brake Noise of Heavy Duty Vehicles", Yuuji Suzuki and Hideo Ohno, pp 287–292, 1981.

"An approach to the solution of disc brake vibration problems", A.M. Lang, and H. Smales, pp. 223–231, IMechE 1983.

SAE Technical Paper Series "Experimental Study on the Reduction of Drum Brake Noise", Masukazu Kusano, Hideki Ishidou, Shuji Matsumura, and Shoichi Washizu, Aug. 4–8, 1985.

SAE Technical Paper Series "Study on Disc Brake Squeal", Masaaki Nishiwaki, Hiroshi Harada, Hiromasa Okamura, and Takahiro Ikeuchi, Feb. 27–Mar. 3, 1989.

(List continued on next page.)

*Primary Examiner*—Robert J. Oberleitner
*Assistant Examiner*—Tyrone M. Lee
*Attorney, Agent, or Firm*—MacMillan, Sobanski & Todd, LLC

[57] ABSTRACT

An improved structure for a brake drum adapted for use in a drum brake assembly includes a generally closed outer end, a generally axially extending cylindrical main body, and an open inner end. The closed outer end of the brake drum includes a centrally located wheel spindle opening formed therein, and a plurality of lug bolt mounting holes spaced circumferentially around the wheel spindle opening. The cylindrical main body of the brake drum includes a plurality of generally axially extending raised ribs provided on an outer surface thereof. Preferably, the ribs define at least three distinct strengthened areas on the brake drum.

12 Claims, 6 Drawing Sheets

U.S. PATENT DOCUMENTS

| | | |
|---|---|---|
| 4,536,936 | 8/1985 | Williams . |
| 4,577,734 | 3/1986 | Williams . |
| 4,773,512 | 9/1988 | Murakami . |
| 4,830,150 | 5/1989 | Denton . |
| 5,097,927 | 3/1992 | Siegrist . |
| 5,238,089 | 8/1993 | Matsuzaki et al. . |
| 5,383,537 | 1/1995 | White ................................. 188/218 R |
| 5,435,419 | 7/1995 | Muzzy . |

OTHER PUBLICATIONS

"An experimental investigation into drum brake squeal", A.M. Lang, T.P. Newcomb, pp. 431–444, IMechE 1989.

"A Study on Brake Noise of Midium Class Trucks and Buses", Yuuji Suzuki, Tsutomu Nishida, pp. 278.1–278.8, 1989.

"Theoretical and Experimental Study on Drum Brake Squeal", Shixiong Chen, Dihua Guan, pp. 371–375, 1991.

"Drum brake interface pressure distributions", A.J. Day, pp. 127–136, Proc Instn Mech Engrs vol. 205, IMechE 1991.

"Suspension Related Low Frequency Rear Drum Brake Noise", Paul D. Halloran, Patricia L. Hetherington, pp. 39–48, 1991.

"Brake Squeal—The Influence of Rotor Geometry, An overview of a presentation to the 10th Annual SAE Braking Colloquium", by Allan M. Lang, Oct. 13, 1992.

"Sensitivity Analysis of Disc Brake Squeal", P.C. Brooks, D.A. Crolla, A.M. Lang, pp. 28–36, AVEC 1992.

BRAKE DRUM HAVING RIBS ON DRUM OUTER SURFACE

CROSS-REFERENCE TO RELATED APPLICATIONS

This application claims the benefit of U.S. Provisional Application Ser. No. 60/008,321, filed Dec. 7, 1995.

BACKGROUND OF THE INVENTION

This invention relates in general to vehicle drum brake assemblies and in particular to an improved structure for a brake drum for use in such a vehicle drum brake assembly.

Most vehicles are equipped with a brake system for slowing or stopping movement of the vehicle in a controlled manner. A typical brake system includes either a disc brake assembly or a drum brake assembly for each of the wheels. The brake assemblies are typically actuated by hydraulic or pneumatic pressure generated by an operator of the vehicle depressing a foot pedal, pulling a hand lever, and the like. The structure and operation of the brake assemblies, as well as the actuators therefore, are well known in the art.

FIG. 9 illustrates a prior art pneumatically actuated drum brake assembly, indicated generally at 110. As shown therein, the drum brake assembly 110 includes a backing plate 112 which is secured to a fixed, non-rotatable component of the vehicle, such as the vehicle axle housing (not shown). A pair of opposed arcuate brake shoes 114 (only one brake shoe 114 is illustrated), are supported on the backing plate 112 for selective movement relative thereto. Each of the brake shoes 114 has a friction pad 116 secured thereto. The brake drum assembly 110 further includes a hollow cylindrical brake drum 118 which is secured to a vehicle wheel (not shown) for rotation therewith. The hollow interior of the brake drum 118 defines an inner cylindrical braking surface 118A. The brake drum 118 is disposed adjacent to the backing plate 112 such that the brake shoes 114 extend within the cylindrical braking surface 118A. To effect braking action, the brake shoes 114 are moved outwardly apart from one another such that the friction pads 116 frictionally engage the cylindrical braking surface 118A of the brake drum 118. Such frictional engagement causes slowing or stopping of the rotational movement of the brake drum 118 and, therefore, the wheel of the vehicle in a controlled manner.

One or more actuating mechanisms are provided in the drum brake assembly 110 for selectively moving the brake shoes 114 outwardly apart from one another into frictional engagement with the cylindrical braking surface 1138A of the brake drum 118. Usually, a pneumatically actuated service brake mechanism is provided for selectively actuating the drum brake assembly 110 under normal operating conditions. A typical service brake mechanism includes an air chamber 120, a lever assembly 122, and a S-cam actuating mechanism 124. To actuate the service brake, pressurized air is supplied to the air chamber 120 to actuate the lever assembly 122 which in turn, rotates the S-cam actuating mechanism 124 (clockwise when viewing FIG. 9) to move brake shoes 114 apart from one another into frictional engagement with the cylindrical braking surface 118A of the brake drum 118. A mechanically actuated parking and emergency brake mechanism is also usually provided for selectively actuating the drum brake assembly 110 in a similar manner.

As discussed above, the rotating inner cylindrical braking surface 118A of the brake drum 118 is frictionally engaged by the non-rotating friction pads 116 of the brake shoes 114 during braking. As a result, brake noise is commonly generated during braking. One source of brake noise can be generated by the brake drum 118 resonating at its natural frequency. Typically, the natural frequency of the brake drum 118 is in the range of 2000 Hz to 5000 Hz but can increase to near 15,000 Hz, and the magnitude of the brake noise generated during braking is in the range of 80 dBa to 120 dBa but can be in excess of 120 dBa.

SUMMARY OF THE INVENTION

This invention relates to an improved structure for a brake drum adapted for use in a drum brake assembly which is effective to minimize the brake drum from resonating at its natural frequency by changing the excitation frequency of the brake drum thereby reducing or eliminating the brake noise produced by the brake drum during braking. In particular, the brake drum of this invention includes a generally closed outer end, a generally axially extending cylindrical main body, and an open inner end. The closed outer end of the brake drum includes a centrally located wheel spindle opening formed therein and a plurality of lug bolt mounting holes spaced circumferentially around the wheel spindle opening. The cylindrical main body of the brake drum includes a plurality of generally axially extending ribs provided on an outer surface thereof. Preferably, the ribs define at least three distinct strengthened areas on the brake drum. The first strengthened area includes a group of five ribs, the second strengthened area includes a group of four ribs, and the third strengthened area includes a group of four ribs. The strengthened areas are effective to change the excitation frequency of the brake drum during braking thereby reducing or minimizing the brake noise produced by the brake drum during braking.

Various objects and advantages of this invention will become apparent to those skilled in the art from the following detailed description of the preferred embodiments, when read in light of the accompanying drawings.

DESCRIPTION OF THE PREFERRED EMBODIMENTS

Figure 1:
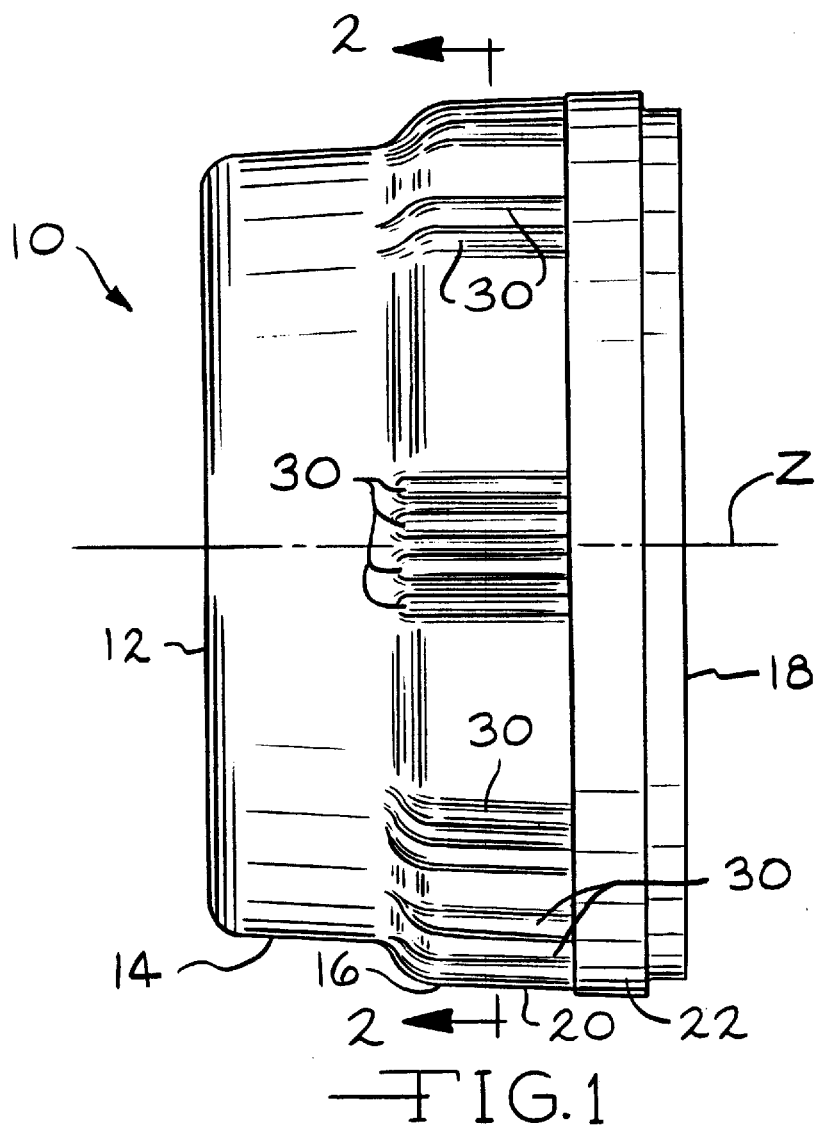
FIG. 1 is a side view of a first embodiment of an improved brake drum constructed in accordance with this invention.

Referring now to the drawings, there is illustrated in FIGS. 1 through 4 a first embodiment of a brake drum, indicated generally at 10, constructed in accordance with the present invention. As shown therein, the brake drum 10 includes a generally closed end or annular bolt flange 12, a transition section 14, a generally axially extending cylindrical main body 16, and an open end 18. The cylindrical body 16 defines an outer surface 20 and, in the illustrated embodiment, includes a raised continuously extending annular squealer band 22.

The brake drum 10 further includes a generally centrally located wheel spindle opening 24 formed therein, and a plurality of lug bolt holes 26 (eight lug bolt holes 26 being shown in this embodiment) spaced circumferentially around the wheel spindle opening 24. The lug bolt holes 26 are adapted to receive wheel mounting studs (not shown) for securing a wheel (not shown) to the brake drum 10 for rotation therewith. The brake drum 10 is typically cast from gray iron, but may be formed from other metals.

The cylindrical body 16 of the brake drum 10 defines a brake drum axis Z and includes a plurality of generally axially extending raised ribs 30 located on the outer surface 20 of the cylindrical body 16. The ribs 30 are preferably formed of the same material as the cylindrical body 16 of the brake drum 10 and are integrally formed thereon during the casting of the brake drum 10. In the illustrated embodiment, the ribs 30 extend axially along the entire length of the outer surface 20 of the cylindrical body 16 of the brake drum 10. Alternatively, the ribs 30 may extend axially along only a portion of the length of the outer surface 20 of the cylindrical body 16 of the brake drum 10.

Figure 2:
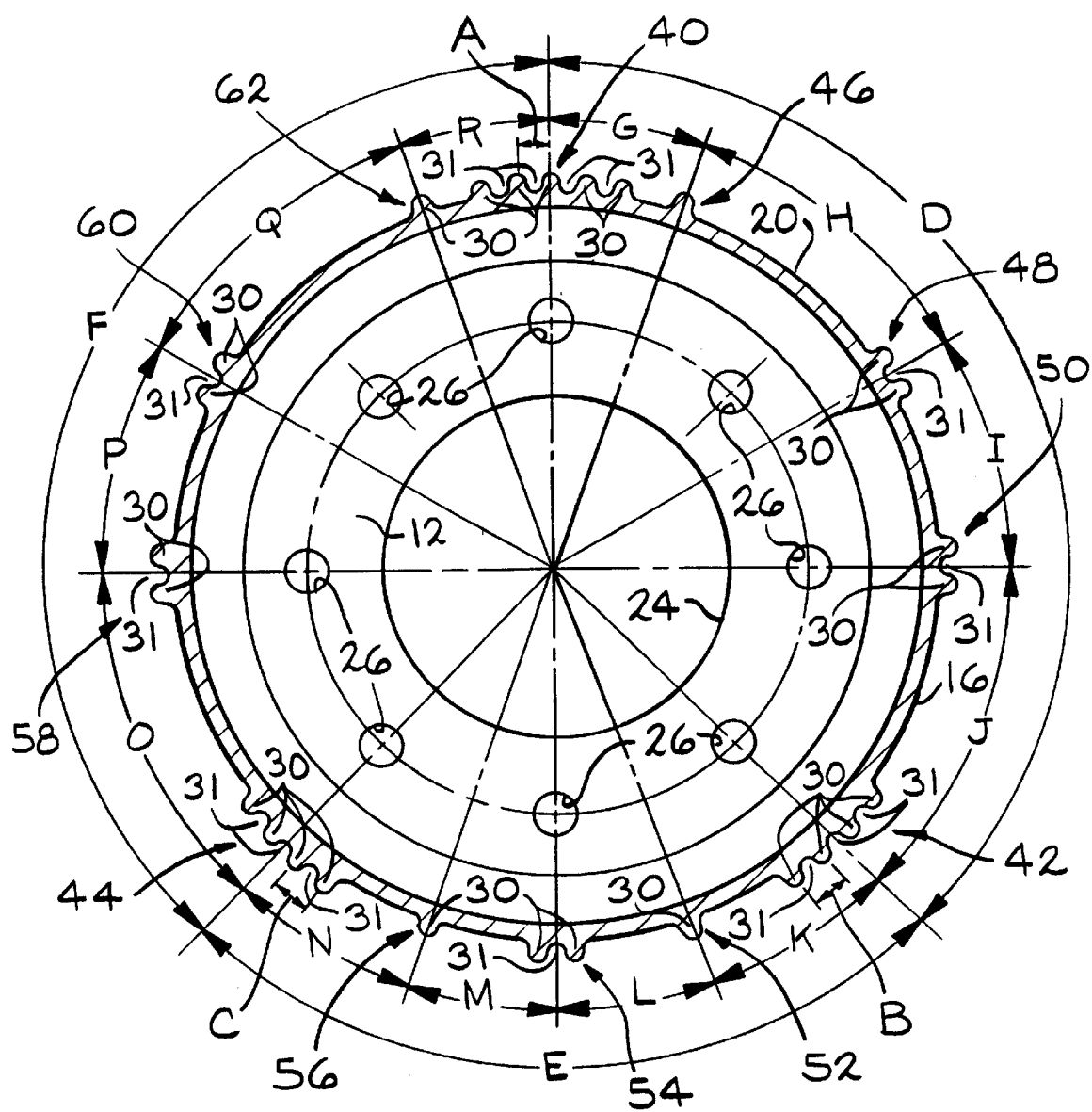
FIG. 2 is a sectional view of the brake drum illustrated in FIG. 1.
Figure 4:
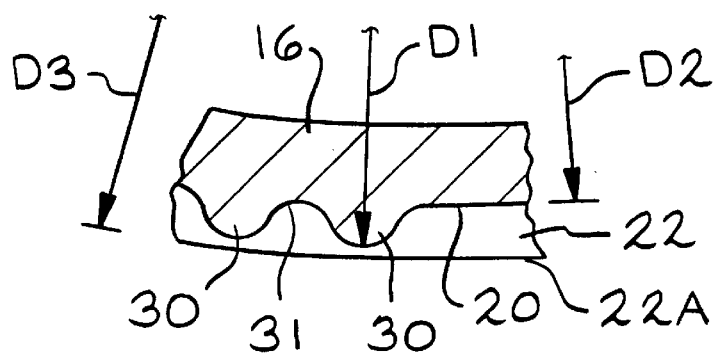
FIG. 4 is a sectional view of a portion of the brake drum illustrated in FIGS. 1 through 3.

As shown in FIG. 2, the illustrated ribs 30 are identical to one another in size and shape. However, the ribs 30 may be differently sized and shaped if desired. In the illustrated embodiment, each of the ribs 30 has a generally circular cross-sectional shape with the ends thereof smoothly blended into the outer surface 20 of the cylindrical body 16 as best shown in FIG. 4. A generally axially extending valley 31 is defined between each successive pair of ribs 30. Each valley 31 has a generally circular cross sectional shape with the ends thereof smoothly blended into the ends of the associated ribs 30. Thus, in the illustrated embodiment, the ribs 30 and valleys 31 are generally of the same shape and size and define similar radii of curvature, although they are oriented in opposite directions.

Figure 3:
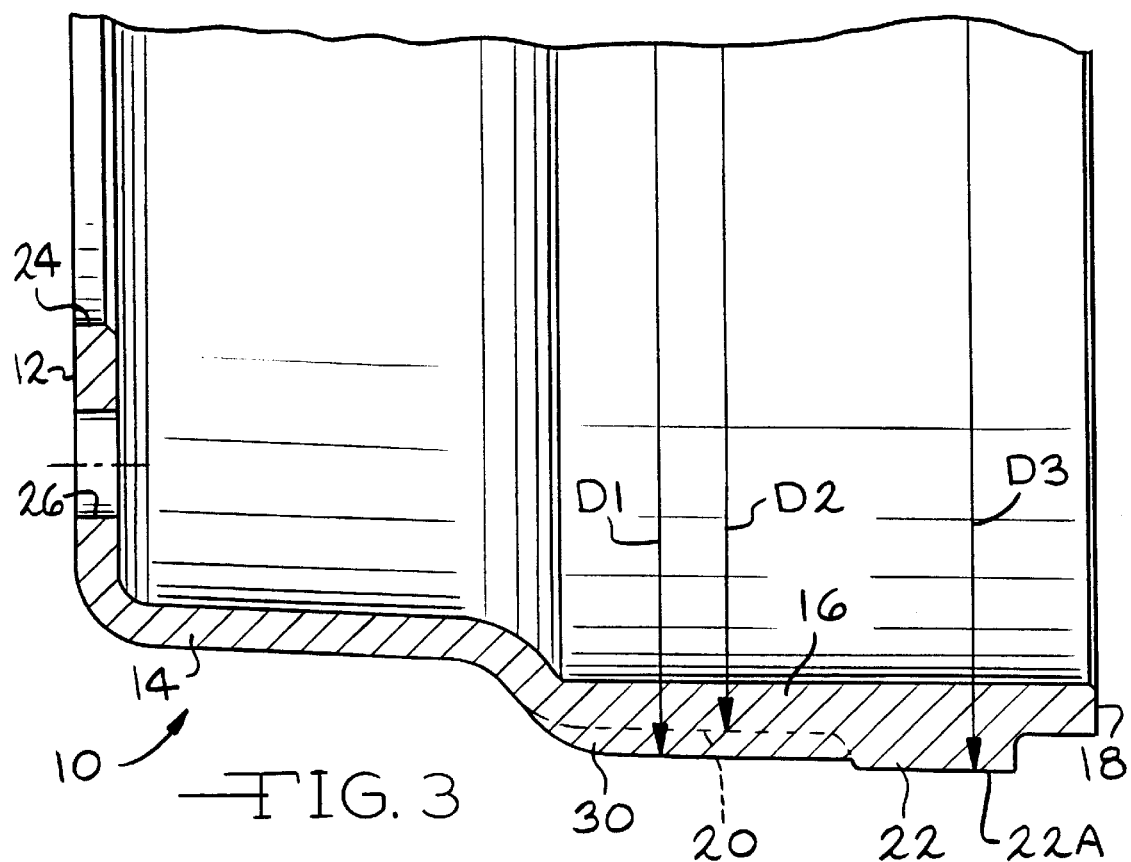
FIG. 3 is a sectional view of a portion of the brake drum illustrated in FIGS. 1 and 2.

As shown in FIGS. 3 and 4, each of the rib 30 defines a rib outer diameter D1. In the illustrated embodiment, the rib outer diameter D1 of each of the ribs 30 is greater than an outer diameter D2 defined by the outer surface 20 of the cylindrical body 16, and less than an outer diameter D3 defined by an outer surface 22A of the squealer band 22. The ribs 30 are arranged circumferentially on the outer surface 20 of the cylindrical body 16 of the brake drum 10 in a predetermined pattern to provide a plurality of distinct strengthened or stiffened areas.

In particular, the ribs 30 define three strengthened areas, indicated generally at 40, 42, and 44, in FIG. 2. In the illustrated embodiment, the strengthened area 40 is collectively formed by a grouping of five individual ribs 30 which are spaced apart from one another by an angle A. The strengthened area 42 is collectively formed by a grouping of four individual ribs 30 which are spaced apart from one another by an angle B. The strengthened area 44 is collectively formed by a grouping of four individual ribs 30 which are spaced apart from one another by an angle C. In the illustrated embodiment, the angle A is approximately 5°, the angle B is approximately 5°, and the angle C is approximately 5°. However, the angles A, B, and C may be varied if desired.

The center of the strengthened area 40 is circumferentially spaced from the center of the strengthened area 42 by an angle D. Similarly, the center of the strengthened area 42 is circumferentially spaced from the center of the strengthened area 44 by an angle E, and the center of the strengthened area 44 is circumferentially spaced from the center of the strengthened area 40 by an angle F. In the illustrated embodiment, the angle D is approximately 135°, the angle E is approximately 90°, and the angle F is approximately 135°. However, the angles D, E, and F may be varied if desired.

The brake drum 10 further includes a plurality of smaller groups of one or more ribs 30, indicated generally at 46, 48, 50, 52, 54, 56, 58, 60, and 62. The groups 46, 48, 50, 52, 54, 56, 58, 60, and 62 of ribs 30 are circumferentially arranged on the outer surface 20 of the cylindrical body 16 of the brake drum 10 in a predetermined pattern to provide additional distinct strengthened areas on the brake drum 10 and also for balancing purposes. The center of the strengthened area 46 is circumferentially spaced from the center of the strengthened area 40 by an angle G, the center of the strengthened area 48 is circumferentially spaced from the center of the strengthened area 46 by an angle H, and the center of the strengthened area 50 is circumferentially spaced from the center of the strengthened area 48 by an angle I. In the illustrated embodiment, the angle G is approximately 20°, the angle H is approximately 40°, and the angle I is approximately 30°. However, the angles G, H, and I may be varied if desired.

The center of the strengthened area 42 is circumferentially spaced from the center of the strengthened area 50 by an angle J, and the center of the strengthened area 52 is circumferentially spaced from the center of the strengthened area 42 by and angle K. The center of the strengthened area 54 is circumferentially spaced from the center of the strengthened area 52 by an angle L, and the center of the strengthened area 56 is circumferentially spaced from the center of the strengthened area 54 by an angle M. In the illustrated embodiment, the angle J is approximately 45°, the angle K is approximately 25°, the angle L is approximately 20°, and the angle M is approximately 20°. However, the angles J. K, L, and M may be varied if desired.

The center of the strengthened area 44 is circumferentially spaced from the center of the strengthened area 56 by an angle N, and the center of the strengthened area 58 is circumferentially spaced from the center of the strengthened area 44 by an angle 0. The center of the strengthened area 60 is circumferentially spaced from the center of the strengthened area 58 by an angle P, the center of the strengthened area 62 is circumferentially spaced from the center of the strengthened area 60 by an angle Q, and the center of the strengthened area 62 is circumferentially spaced from the center of the strengthened area 40 by an angle R. In the illustrated embodiment, the angle N is approximately 25°, the angle O is approximately 45°, the angle P is approximately 30°, the angle Q is approximately 40°, and the angle R is approximately 20°. However, the angles N, O, P, Q, and R may be varied if desired.

Figure 5:
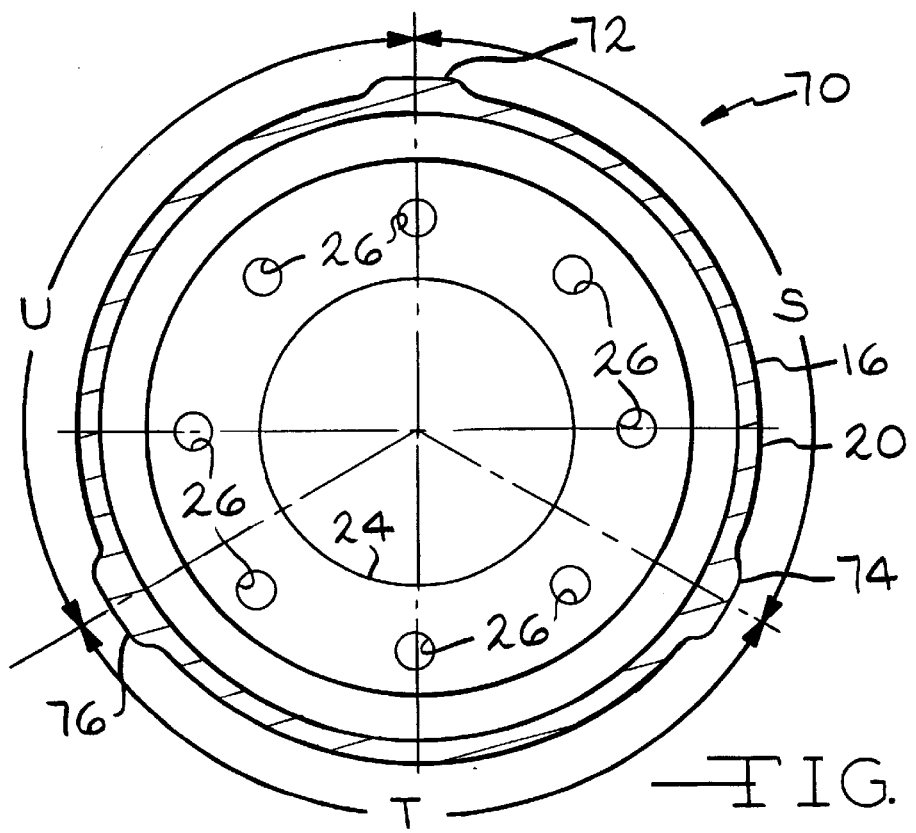
FIG. 5 is a sectional view similar to FIG. 2 of a second embodiment of a brake drum in accordance with this invention.

Turning now to FIG. 5, there is illustrated a second embodiment of a brake drum, indicated generally at 70, in accordance with this invention. The brake drum 70 includes three axially extending raised ribs 72, 74, and 76 arranged circumferentially on the outer surface 20 of the cylindrical body 16 thereof in a predetermined pattern to define three distinct strengthened areas. In the illustrated embodiment, the ribs 72, 74, and 76 are identical to one another in size and shape and are integrally formed during the casting of the brake drum 70.

As shown in FIG. 5, the center of the rib 72 is circumferentially spaced from the center of the rib 74 by an angle S, the center of the rib 74 is circumferentially spaced from the center of the rib 76 by an angle T, and the center of the rib 76 is circumferentially spaced from the center of the rib 72 by an angle U. In the illustrated embodiment, the angle S is approximately 120°, the angle T is approximately 120°, and the angle U is approximately 120°. However the angles S, T, and U may be varied if desired.

Figure 6:
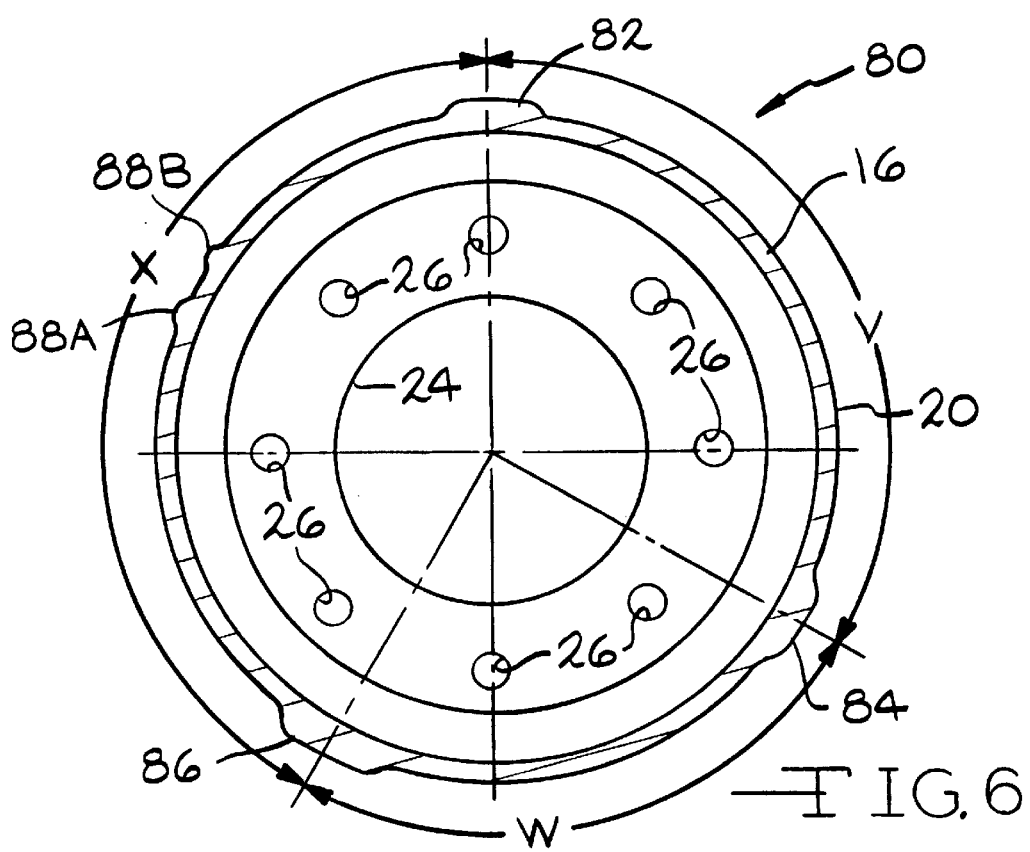
FIG. 6 is a sectional view similar to FIG. 2 of a third embodiment of a brake drum in accordance with this invention.

FIG. 6 illustrates a third embodiment of a brake drum, indicated generally at 80, in accordance with this invention. The brake drum 80 includes three axially extending raised ribs, 82, 84, and 86 which are arranged circumferentially on the outer surface 20 of the cylindrical body 16 thereof in a predetermined pattern to provide three distinct strengthened areas. In the illustrated embodiment, the ribs 82, 84, and 86 are identical to one another in size and shape.

As shown in FIG. 6, the center of the rib 82 is spaced from the center of the rib 84 the rib 84 by an angle V, the center of the rib 84 is spaced from the center of the rib 86 by an angle W, and the center of the rib 86 is spaced from the center of the rib 82 by an angle X. In the illustrated embodiment, the angle V is approximately 120°, the angle W is approximately 90°, and the angle X is approximately 150°. However, the angles V, W, and X may be varied if desired.

The brake drum 80 further includes two axially extending raised ribs 88A and 88B which are circumferentially arranged on the outer surface 20 of the cylindrical body 16 of the brake drum 80 in a predetermined pattern to provide additional distinct strengthened areas on the brake drum 80 and for balancing purposes. The particular size and location of the ribs 88A and 88B is dependent upon the particular size and spacing of the ribs 82, 84, and 86.

Figure 7:
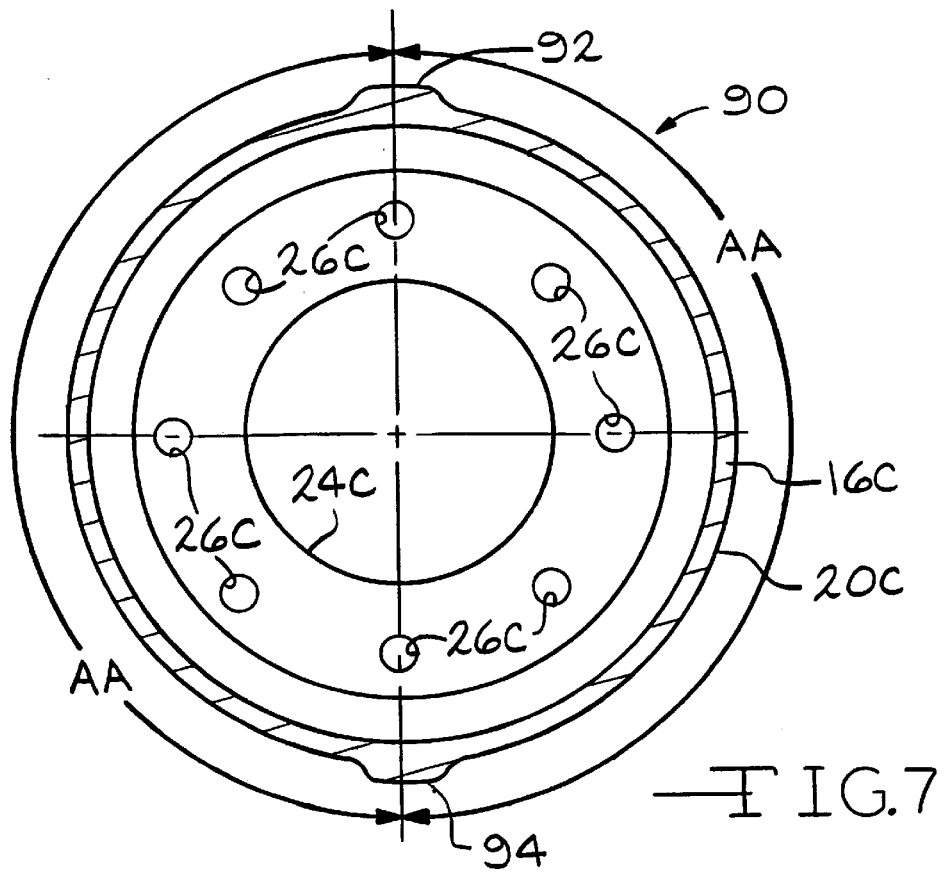
FIG. 7 is a sectional view similar to FIG. 2 of a fourth embodiment of a brake drum in accordance with this invention.

FIG. 7 illustrates a fourth embodiment of a brake drum, indicated generally at 90, in accordance with this invention. As shown therein, the brake drum 90 includes two axially extending raised ribs 92 and 94 which are arranged circumferentially on the outer surface 20 of the cylindrical body 16 thereof in a predetermined pattern to provide two distinct strengthened areas. As shown therein, the ribs 92 and 94 are identical to one another in size and shape and are spaced apart from one another by equal angles AA of 180°.

Figure 8:
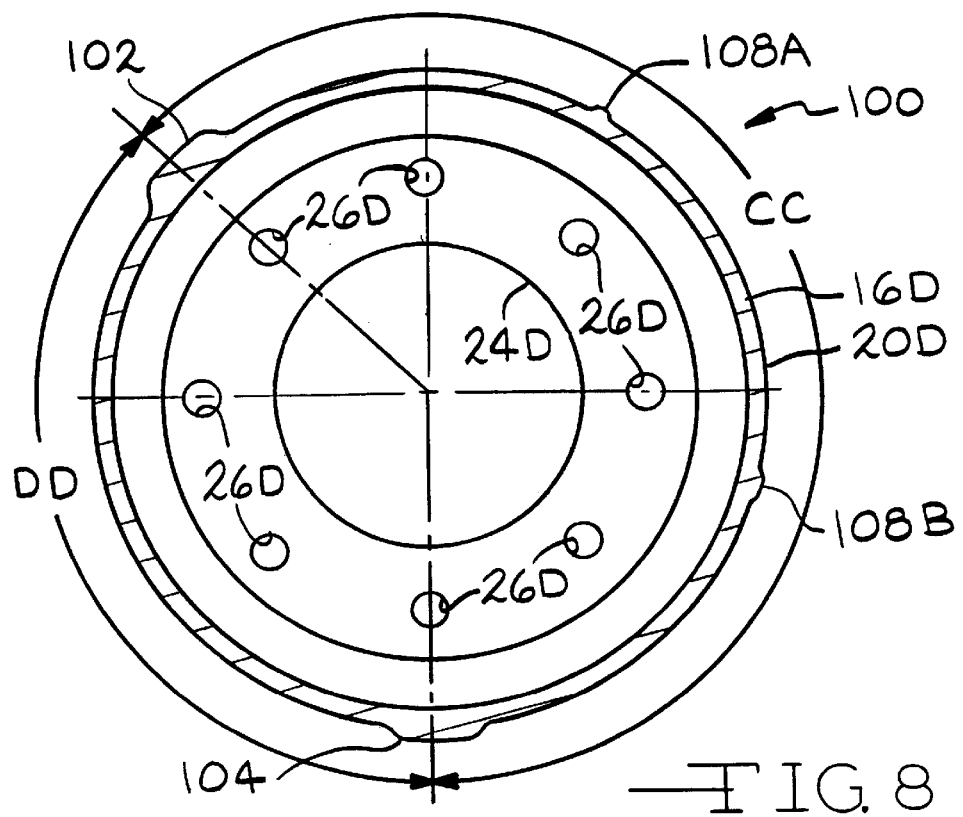
FIG. 8 is a sectional view similar to FIG. 2 of a fifth embodiment of a brake drum in accordance with this invention.
Figure 9:
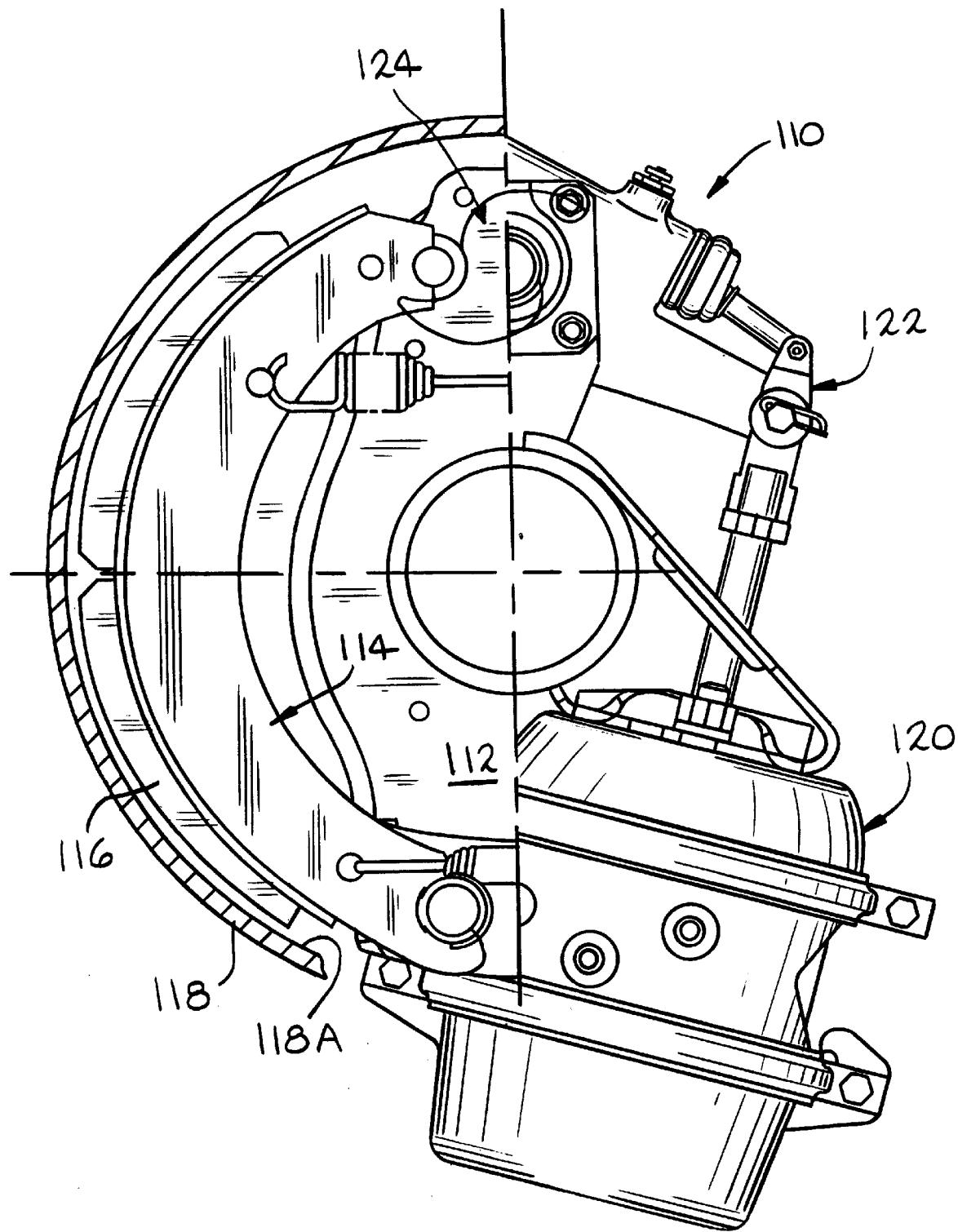
FIG. 9 is a sectional view, partially broken away, of a portion of a prior art drum brake assembly.

FIG. 8 illustrates a fifth embodiment of a brake drum, indicated generally at 100, in accordance with this invention. The brake drum 100 includes two axially extending raised ribs 102 and 104 which are arranged circumferentially on the surface 20 of the cylindrical body 16 thereof in a predetermined pattern to provide two distinct strengthened areas. As shown therein, the ribs 102 and 104 are identical to one another in size and shape and are spaced apart from one another by unequal angles CC and DD. In the illustrated embodiment, the angle CC is approximately 225° and the angle DD is approximately 135°. However, the angles CC and DD may be varied if desired.

The brake drum 100 further includes two axially extending raised ribs 108A and 108B which are circumferentially arranged on the outer surface 20 of the cylindrical body 16 of the brake drum 100 in a predetermined pattern to provide additional distinct strengthened areas on the brake drum 100 and for balancing purposes. The particular size and location of the ribs 108A and 108B is dependent upon the particular size and spacing of the ribs 102 and 104.

Although the structure of the brake drum 10, 70, 80, 90, and 100 of this invention has been described and illustrated as having the particular ribs disclosed herein, it will be appreciated that the size, spacing, and configuration of the ribs can be other than illustrated and described herein. Also, while this invention has been described and illustrated in connection with a full cast gray iron brake drum, it will be appreciated that the brake drum of this invention may be used in connection with other brake drums. For example, the brake drum can be constructed from other metals. Also, the brake drum can be a "composite" brake drum (not shown), or an "integral hub" brake drum (not shown).

In addition, although the brake drum of this invention has been described and illustrated in connection with the particular drum brake assembly disclosed herein, the brake drum can be used in connection with other kinds of vehicles and/or other drum brake assemblies. For example, this invention may be used in an automobile and a light or medium duty truck, and or in a "duo-servo" type of drum brake assembly (not shown), in a "dual mode" drum brake assembly (not shown), wherein the service brake is of the leading trailing type and the parking and emergency brake is of the duo-servo type, in a "drum-in-hat" disc brake assembly (not shown), wherein the service brake is a disc brake and the parking and emergency brake is a drum brake.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A brake drum adapted for use in a drum brake assembly comprising:

a generally closed outer end, an opened inner end, and a generally axially extending cylindrical main body defining a brake drum axis and connecting said closed outer end to said opened inner end, said cylindrical main body including only twenty-seven axially extending raised ribs provided on an outer surface thereof, said twenty-seven raised ribs defining a plurality of groups of at least one raised rib circumferentially spaced on said outer surface in a predetermined pattern, said plurality of groups including a first group of five spaced apart raised ribs, a second group of one raised rib, a third group of two spaced apart raised ribs, a fourth group of two spaced apart raised ribs, a fifth group of four spaced apart raised ribs, a sixth group of one raised rib, a seventh group of two spaced apart raised ribs, an eighth group of one raised rib, a ninth group of four spaced apart raised ribs, a tenth group of two spaced apart raised ribs, an eleventh group of two spaced apart raised ribs, and a twelfth group of one raised rib.

2. The brake drum defined in claim 1 wherein said brake drum includes a raised continuously extending annular squealer band adjacent said opened inner end, said squealer band including an outer surface which defines a squealer band outer diameter, said outer surface of said cylindrical main body defines a body outer diameter, and each of said twenty-seven raised ribs having a generally circular cross-sectional shape which defines a respective rib outer diameter which is greater than said body outer diameter and less than said squealer band outer diameter.

3. The brake drum defined in claim 1 wherein all of said twenty-seven raised ribs extend axially along the entire length of said outer surface of said cylindrical main body.

4. The brake drum defined in claim 1 wherein all of said twenty-seven ribs are identical to one another in size and shape.

5. The brake drum defined in claim 1 wherein between said ribs of said first, third, fourth, fifth, seventh, ninth, tenth, and eleventh groups is defined a valley having a generally circular cross sectional shape.

6. The brake drum defined in claim 5 wherein said ribs of said first, third, fourth, fifth, seventh, ninth, tenth, and eleventh groups and said valleys thereof are generally of the same shape and size and define similar radii of curvature although oriented in opposite directions.

7. The brake drum defined in claim 1 wherein said ribs of said first, third, fourth, fifth, seventh, ninth, tenth, and eleventh groups are spaced apart from one another by an angle of approximately 5°.

8. The brake drum defined in claim 1 wherein said first group of ribs defines a first strengthened area having a first center, said fifth group of ribs defines a fifth strengthened area having a fifth center, said ninth group of ribs defines a ninth strengthened area having a ninth center, said first center being spaced from said fifth center by a first predetermined angle, said fifth center being spaced from said ninth center by a second predetermined angle, said ninth center being spaced from said first center by a third predetermined angle, at least two of said first, second, and third predetermined angles being generally the same.

9. The brake drum defined in claim 8 wherein said first predetermined angle is approximately 135°, said second predetermined angle is approximately 90° and said third predetermined angle is approximately 135°.

10. The brake drum defined in claim 1 wherein said first group of ribs defines a first strengthened area having a first center, said second group of ribs defines a second strengthened area having a second center, said third group of ribs defines a third strengthened area having a third center, said fourth group of ribs defines a fourth strengthened area having a fourth center, said fifth group of ribs defines a fifth strengthened area having a fifth center, said sixth group of ribs defines a sixth strengthened area having a sixth center, said seventh group of ribs defines a seventh strengthened area having a seventh center, said eighth group of ribs defines an eighth strengthened area having an eighth center, said ninth group of ribs defines a ninth strengthened area having a ninth center, said tenth group of ribs defines a tenth strengthened area having a tenth center, said eleventh group of ribs defines an eleventh strengthened area having an eleventh center, said twelfth group of ribs defines a twelfth strengthened area having a twelfth center, said first center being spaced from said second center by an angle of approximately 20°, said second center being spaced from said third center by an angle of approximately 40°, said third center being spaced from said fourth center by an angle of approximately 30°, said fourth center being spaced from said fifth center by an angle of approximately 45°, said fifth center being spaced from said sixth center by an angle of approximately 25°, said sixth center being spaced from said seventh center by an angle of approximately 20°, said seventh center being spaced from said eighth center by an angle of approximately 20°, said eighth center being spaced from said ninth center by an angle of approximately 25°, said ninth center being spaced from said tenth center by an angle of approximately 45°, said tenth center being spaced from said eleventh center by an angle of approximately 30°, said eleventh first center being spaced from said twelfth center by an angle of approximately 40°, and said twelfth center being spaced from said first center by an angle of approximately 20°.

11. The brake drum defined in claim 1 wherein said closed outer end of said brake drum includes a generally centrally located wheel spindle opening formed therein, and a plurality of lug bolt holes spaced circumferentially around said wheel spindle opening.

12. The brake drum defined in claim 1 wherein said brake drum is cast from gray iron.

* * * * *